(12) United States Patent
Price et al.

(10) Patent No.: US 10,277,516 B2
(45) Date of Patent: Apr. 30, 2019

(54) STATISTICAL APPROACHES IN NSX SCALE TESTING

(71) Applicant: Nicira, Inc., Palo Alto, CA (US)

(72) Inventors: Reid Price, Palo Alto, CA (US); Fred Grim, San Mateo, CA (US)

(73) Assignee: Nicira, Inc., Palo Alto, CA (US)

( * ) Notice: Subject to any disclaimer, the term of this patent is extended or adjusted under 35 U.S.C. 154(b) by 80 days.

(21) Appl. No.: 15/363,646

(22) Filed: Nov. 29, 2016

(65) Prior Publication Data

US 2018/0152263 A1    May 31, 2018

(51) Int. Cl.
*G01R 31/08* (2006.01)
*H04L 12/851* (2013.01)
*H04L 12/26* (2006.01)

(52) U.S. Cl.
CPC .......... *H04L 47/24* (2013.01); *H04L 43/0823* (2013.01)

(58) Field of Classification Search
USPC .......................................... 370/229, 230, 328
See application file for complete search history.

(56) References Cited

U.S. PATENT DOCUMENTS

2007/0117516 A1*   5/2007   Saidi ..................... H04L 47/10
                                                          455/67.11

* cited by examiner

*Primary Examiner* — Phuongchau Ba Nguyen
(74) *Attorney, Agent, or Firm* — Patterson + Sheridan, LLP

(57) ABSTRACT

A central controller may determine rates at which endpoints are to send packets to test connections and may adjust these rates based on feedback information from the endpoints regarding tested connections.

19 Claims, 3 Drawing Sheets

STATISTICAL APPROACHES IN NSX SCALE TESTING

BACKGROUND

Software-defined networking (SDN) often uses network controllers to configure logical networks throughout a datacenter. For example, a logical network may be defined by a configuration that defines the endpoints of the logical network and connections (e.g., logical switches, logical routers, paths, etc.) between the endpoints. An endpoint may refer generally to an originating node ("source endpoint") or terminating node ("destination endpoint") of a flow of network packets, which can comprise one or more network packets being passed from the source to the destination endpoint. In practice, an endpoint may be a physical computing device (e.g., physical server, physical host), virtualized computing instance (e.g., virtual machine, container, data compute node, isolated user space instance) supported by a physical computing device, etc.

A user (e.g., administrator) of the logical network may want to ensure that the logical network operates as intended based on the configuration that defines the logical network. For example, a user may want to ensure that all endpoints are able to send traffic (i.e., network packets) at all times to all other endpoints to which they can connect according to the configuration of the logical network.

SUMMARY

Herein described are one or more embodiments of a method for testing a logical network comprising a plurality of endpoints. The method includes determining, for each of one or more categories of traffic, a rate at which to send packets to test a connection between endpoints in the logical network. The method further includes transmitting an indication, including the rate for each of the one or more categories of traffic, to one or more of the endpoints. The method further includes receiving feedback information from the one or more endpoints, including information related to a failure rate for each of the one or more categories of traffic.

Also described herein are embodiments of a computer system, wherein software for the computer system is programmed to execute the method described above for testing a software defined network comprising a plurality of endpoints.

Also described herein are embodiments of a non-transitory computer readable medium comprising instructions to be executed in a computer system, wherein the instructions when executed in the computer system perform the method described above for testing a software defined network comprising a plurality of endpoints.

DETAILED DESCRIPTION

Embodiments presented herein relate to testing connections between endpoints in a logical network to ensure the logical network is functioning correctly. In some embodiments, the logical network is simulated in a test environment based on a configuration that defines the logical network. For example, in some cases a network controller may be configured to direct certain endpoints to transmit packets on certain connections to test the validity of that connection. However, as the size of the logical network grows, it may not be feasible for the network controller to test these connections individually.

For example, assume for simplicity there are $2^{16}$ endpoints that are completely connected in a network, such as a logical network. The $2^{16}$ endpoints may be part of the same layer-3 (L3) domain. Further, the $2^{16}$ endpoints may be fully connected by a single router (e.g., a single physical router, or a single logical router implemented by one or more physical switches or routers). Accordingly, there are $2^{32}$ connections between pairs of endpoints to verify. Thus, when testing the connections, if a single network packet (e.g., tunnel-encapsulated ping) is sent by the network controller in each direction for each connection, the network controller would need to transmit over 100 GB of traffic for each validation. Even if validating each connection in such a manner were feasible to do in a given time period $\Delta t$ the amount of traffic grows asymptotically as $\Delta t \rightarrow 0$. Thus, embodiments described herein relate to techniques for testing connections between endpoints in a logical network that resolve these issues, for example, by conducting the testing in a distributed manner. For example, instead of the network controller individually instructing each endpoint in the network to transmit network packets to test connections, in certain embodiment, each endpoint autonomously transmits network packets (e.g., according to certain rules), as further described below.

Figure 1:
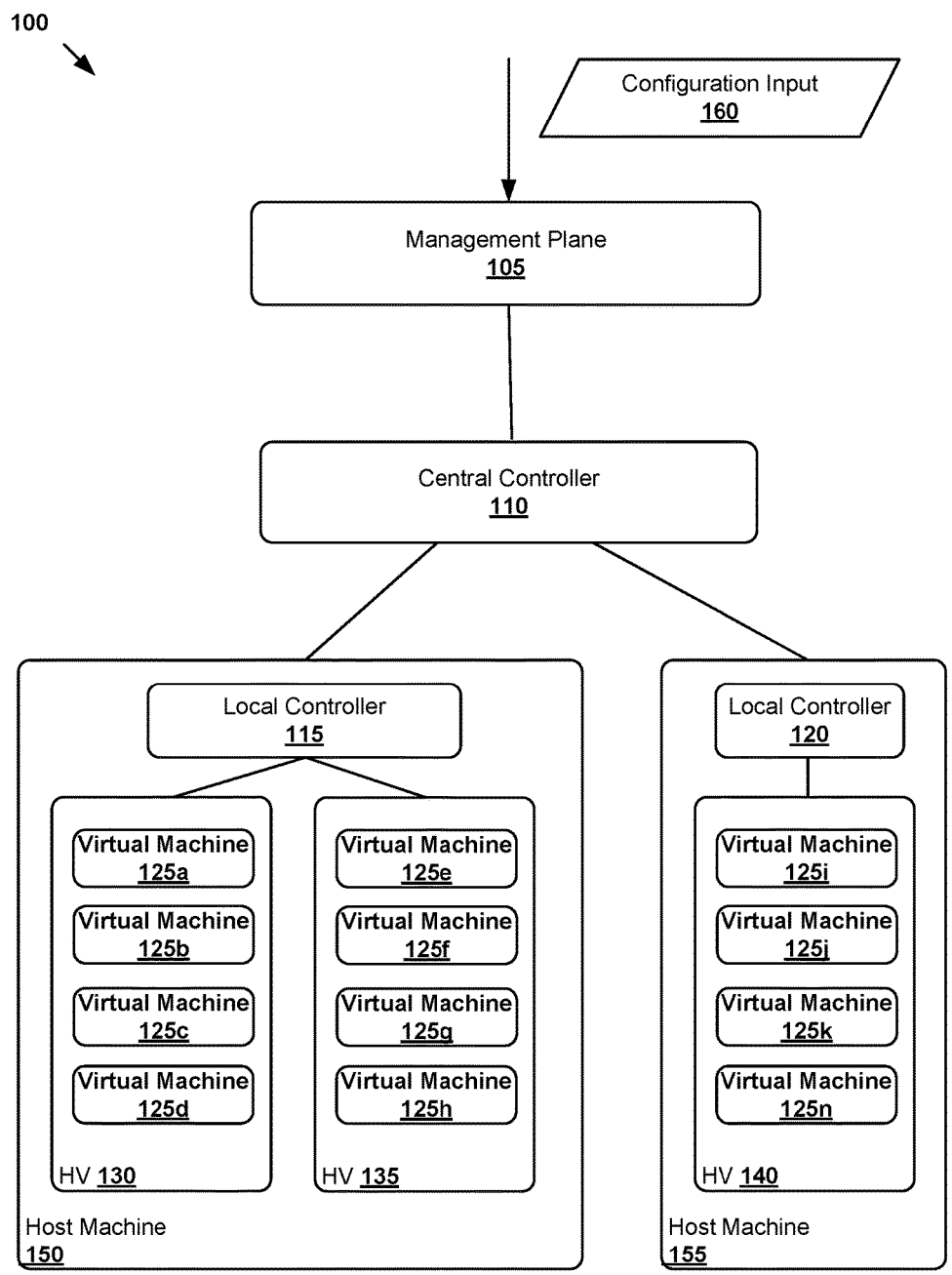
FIG. 1 is a block diagram of a network control system for a virtual network.

FIG. 1 is a block diagram of a network control system 100 including a central controller 110 (i.e., a network controller) that implements embodiments described herein. In some embodiments, network control system 100 is an example of a test environment to test a logical network. As shown, network control system 100 includes a management plane 105, a central controller 110, and multiple local controllers (also called the local control plane (LCP)) 115 and 120 that operate on host machines 150-155, which are physical computing devices that support execution of virtual machines (VMs) or other virtualized computing instances. In addition, each of host machines 150-155 runs a hypervisor 130-140 capable of creating and managing a plurality of virtual machines 125a-125n on host machines 150-155. Each of virtual machines 125a-125n are examples of endpoints. Though some embodiments are described herein with respect to virtual machines 125a-125n as endpoints, it should be noted that other types of endpoints may also be used with the described techniques.

Hypervisors 130-140 and virtual machines 125a-125n, for example, are stored in a memory of host machines 150-155. Hypervisors 130-140 abstract processor, memory, storage, and/or networking resources into multiple virtual machines (e.g., VMs 125a-125n) that can run side-by-side on the same host machines 150-155. That is, the virtualization software partitions physical host machines 150-155 into multiple secure and portable virtual machines that run on the same physical servers. Each virtual machine represents a complete virtual system—with virtual processors, virtual memory, virtual networking interface, virtual disk storage, and its own BIOS. In one embodiment, virtualization software can be installed directly on the server hardware and inserts a hypervisor between the hardware and the operating system.

Alternatively, the virtualization software may run on top of a conventional operating system in the server.

While not illustrated, each VM 125a-125n may include a software-based virtual network adapter that is logically connected to a physical network adapter (e.g., local controllers 115-120) included in host machines 150-155 that provides network access for the virtual machine. The virtual network adapter is typically connected to the physical network adapter through a software-based "switch," such as virtual switch.

Though shown as a single entities, it should be understood that both management plane 105 and central controller 110 may be implemented as a distributed or clustered systems. That is, management plane 105 may include multiple computing devices that implement management plane functions, and a central control plane may include multiple central controller computers or virtual machines or containers (or other logical compute instances (including central controller 110) that implement central control plane functions. In some embodiments, each centralized controller includes both management plane and central control plane functions (e.g., as separate applications or functions).

In some embodiments, management plane 105 is responsible for receiving logical network configuration inputs 160 (e.g., through an application programming interface). Users (e.g., network administrators) may further input logical network configuration data through, e.g., a command-line interface, a graphical user interface, etc. Each logical network configuration for each logical network, in some embodiments, may include data defining one or more endpoints (e.g., virtual machines 125a-125n) and the connections between the endpoints.

Management plane 105 further generates desired state data that specifies how the logical network should be implemented in the physical infrastructure based on logical network configuration input 160. In some embodiments, this data includes description of the logical forwarding elements and logical ports in a uniform format (e.g., as a set of database records or another format). The central controller 110 then updates/implements the logical network based on the desired state information. In certain embodiments, central controller 110 is responsible for ensuring that all endpoints in the logical network are able to send traffic at all times to all other endpoints that the network defines them as connected to, for example, using the techniques described herein.

Figure 2:
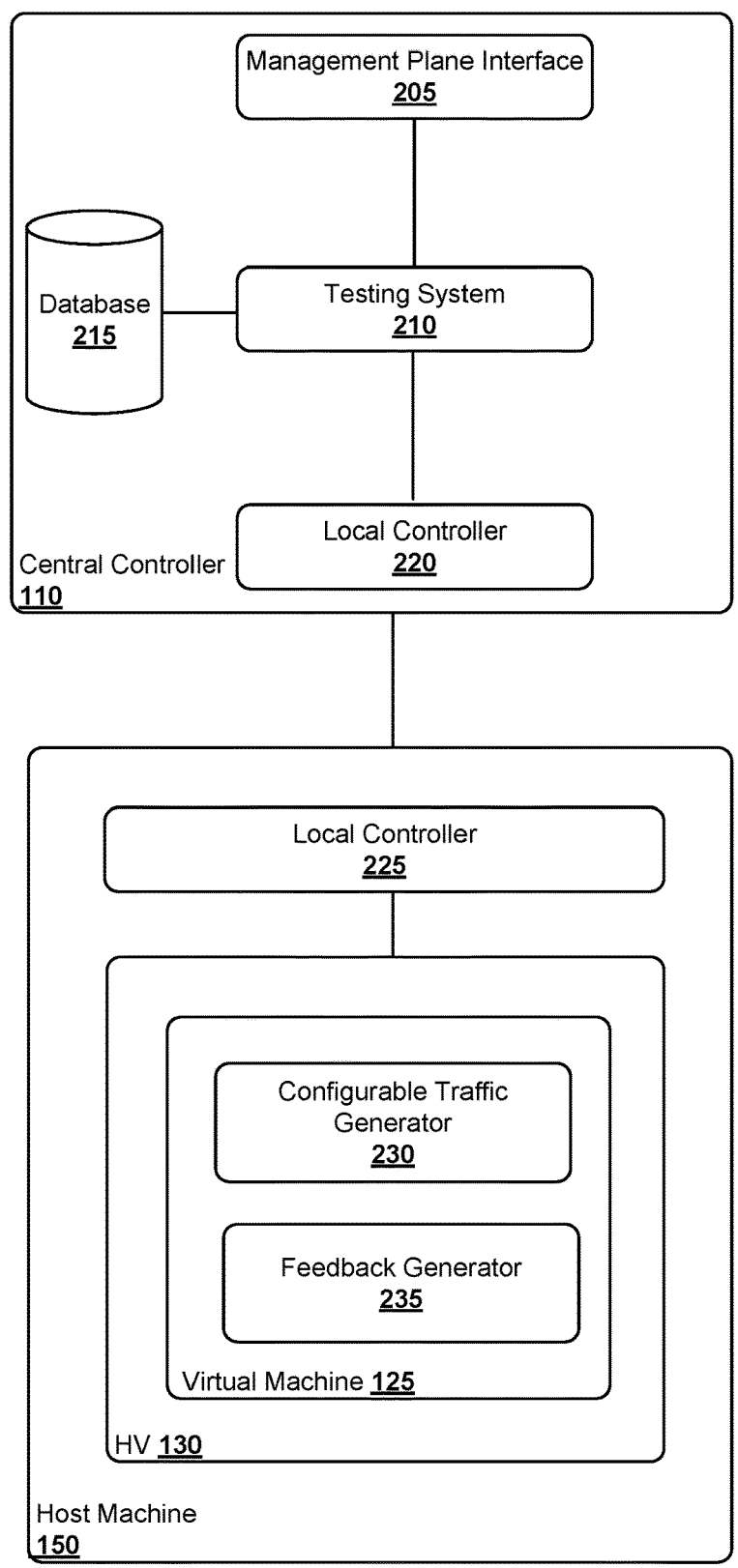
FIG. 2 is a block diagram of a central controller of FIG. 1.

FIG. 2 illustrates the architecture of central controller 110 and VM 125 running on host machine 150.

As illustrated, central controller 110 includes a management plane interface 205, a testing system 210, a database 215, and a local controller 220 (also called a local control plane interface). Further, VM 125 includes a configurable traffic generator 230 and a feedback generator 235.

Management plane interface 205 of central controller 110 handles interactions with management plane 105. Additionally, local controller 220 may handle interactions described herein with host machine 150 (e.g., via local controller 225 on host machine 150).

In certain embodiments, central controller 110 is configured to direct testing of connections between endpoints as follows. Testing system 210 of central controller 110 may determine rates for different categories of traffic for endpoints in the network to send packets to test connections in the network. In some embodiments, the rates for different categories are based on an overall rate for sending packets in the logical network (e.g., limited by an overall bandwidth of the logical network), where the overall rate is divided among the different categories. In some cases, for example, when beginning testing, these rates may be set to default testing rates, which may be further refined/adjusted based on feedback information as explained below. According to certain embodiments, categories of traffic may include protocol based categories and logical network structure based categories such as Transmission Control Protocol (TCP) traffic, User Datagram Protocol (UDP) traffic, Internet Control Message Protocol (ICMP) traffic, traffic traversing only switches or only routers, traffic that is designed to test a set of connections within defined firewall rules, etc. However, it should be noted that the embodiments presented herein are not limited to these categories of traffic and may include other categories of traffic not listed.

Central controller 110 may then transmit an indication of these rates to the endpoints in the network, for example, by storing it in database 215, which may be accessed by the endpoints in the logical network, for example, using a separate test network from the logical network over which endpoints exchange packets (e.g., a different namespace for the test network than the logical network). In some embodiments, using a separate test network ensures that any failures with the logical network do not affect the communication of test information between the endpoints and central controller 110.

According to certain embodiments, database 215 may be a key-value store, such as a cluster of Riak nodes and data (e.g., the rates per category of traffic) may be stored via an HTTP interface (not shown) over the separate test network by central controller 110 and/or endpoint. In some embodiments, the database 215 may be an ACID compliant SQL data store, or other suitable data store. Database 215 is shown as integrated in the central controller 110. However, in some embodiments, database 215 may be external to central controller 110.

According to embodiments, virtual machine 125 may access the stored rates in database 215, for example, via local controller 225, which manages interactions between host machine 150 and central controller 110. In some cases, database 215 may be accessed by VM 125 via a Solr-based search interface or a discrete key lookup. According to embodiments, the rate indications may indicate to VM 125 when and how often to send packets corresponding to the different categories of traffic, for example, when instructed by central controller 110 to begin testing.

For example, central controller 110 may transmit an indication to one or more VMs 125 in the network (e.g., via local controller 220), triggering these VMs to begin testing connections. It should be noted that in some embodiments, VM 125 may access the rates before or after receiving the indication.

Upon receiving the indication, configurable traffic generator 230 in VM 125 autonomously begins generating and transmitting packets (e.g., pings) to test connections with other VMs for each category of traffic at the indicated rates. According to aspects, having the VMs autonomously transmit test packets significantly reduces the burden on the system by reducing the amount of signaling needed to test connections, as compared to having central controller 110 triggering the transmission of each packet as explained above.

According to embodiments, in some cases, during testing, a feedback generator 235 in VM 125 may record which packets transmitted for each category of traffic are successful and which packets failed. For example, a successful packet is when the VM 125 receives a response (e.g., from another endpoint) to a transmitted packet, whereas a packet that has failed is a packet for which no response is received. Feedback generator 235 may then determine a success/failure rate of the total number of packets transmitted based on how many packets succeeded or failed and may indicate this success/failure rate to the central controller 110 in feedback information (e.g., via database 215).

In other cases, VM 124 may indicate to central controller 110 (e.g., via database 215) feedback information including an indication of the packets sent by VM 125 and any packets received by VM 125. For example, VM 125 may indicate a number of packets sent to and received from each of a plurality of endpoints. Based on this information, testing system 210 determines a success/failure rate for the connections for each category of traffic. A success is when a packet indicated sent by a source VM is also indicated as received by a destination VM. A failure is when the sent packet is not indicated as received.

According to certain embodiments, testing system 210 adjusts the rates at which to transmit packets for the categories of traffic, for example, based at least in part on the success/failure rate of the packets on the tested connections. For example, testing system 210 may calculate the adjusted rates according to:

$$\text{rate}_{category} = \text{rate}_{total} \times \frac{\text{error}_{category}}{\text{error}_{total}} = \frac{R\sqrt{p_c(1-p_c)}}{\sum_{x \in [1,n]} \sqrt{p_x(1-p_x)}}, \quad (\text{eq 1})$$

where R is the total rate of sending packets across all categories, $p_c$ is the success rate (i.e., proportion of successfully communicated packets) for a particular category, and $p_1 \ldots _n$ is the success rate for all categories. Thus, using the feedback information, central controller 110 may take the proportion of successful traffic it observes across the many categories of traffic and determine how and where to send traffic next to get the most information out of the system based on the limited bandwidth of the logical network. For example, in some cases, during testing, some categories of traffic may always succeed and some categories of traffic may always fail. Determining the rates at which to transmit packets for testing connections in this manner may optimally utilize resources by diverting traffic away from these always-succeeding and always-failing categories of traffic to focus on categories with unexpected success or failure. In other words, based at least on the success/failure rate of packets on the tested connections, testing system 210 may adjust the rates for the categories of traffic to get a better granularity/confidence of the success/failure rate with categories of unexpected success and failure. Further, in some embodiments, the testing system 210 may adjust the categories of traffic tested, such as by redefining the categories of traffic based on the feedback information. For example, for categories with unexpected success and failure, categories may be more narrowly defined to better determine exactly what type of traffic is succeeding or failing.

It should be noted, however, that in the presence of always-succeeding or always-failing traffic, Equation 1 may reduce to zero (i.e., a rate of zero would indicate not to send packets designed to test a particular category of traffic). However, in practice, this constant success or failure is not static and is capable of changing over time. Thus, central controller 110 may utilize a minimum rate to continue to send some traffic to test these always-succeeding/always-failing traffic categories to ensure the connections for these categories of traffic are still valid.

For example, suppose testing system 210 observes a particular category of traffic that always appears to be succeeding, but wants to ensure that a failure in this category of traffic is caught. Detecting a single dropped packet would be enough to alert the network controller to this problem. Thus, the network controller may transmit state information to each endpoint in the network, indicating other endpoints in the network that are reachable from each endpoint. In some embodiments, the reachability of endpoints may not be bidirectional (e.g., a first endpoint can transmit packets to a second endpoint, but not vice versa). Each of the endpoints in the network may then randomly select connections with other reachable endpoints in the network to test and may send traffic at a rate r/seconds over d seconds, thus detecting an outage on e percent of the connections between endpoints p percent of the time. Accordingly, the network controller may calculate for each category of traffic the minimum rate at which to send test packets according to:

$$(p \le (1-e)^{\lfloor rd \rfloor}) \Rightarrow \left( r \ge \frac{\lceil \log_{1-e} p \rceil}{d} \right) \quad (\text{eq 2})$$

As an example, suppose we want to know the minimum packets per second (r) so that there is a 1% chance (p=0.01) of missing any outage lasting at least 5 second (d=5) effecting at least 1% of edges (e=0.01). Using Equation 2 above, the required minimum rate is 91.8 packets per second:

$$r \ge \frac{\lceil \log_{1-e} p \rceil}{d} = \frac{\lceil \log_{.99} \cdot .01 \rceil}{5} = 91.8$$

In some cases, testing system 210 may calculate the minimum rate for endpoints rather than the connections between endpoints, since any endpoint that fails will cause all connections to that endpoint to also fail. For example, in a worst case topology (e.g., a mesh topology where all endpoints are connected to all other endpoints) where there may be f number of failures in T endpoints, testing system 210 may approximate the probability of detecting a failure with a modification to the logic of Equation 2 for connections. For example, as there are two endpoints to a connection, the failure probability is squared, and the testing system 210 may determine the minimum rate for endpoints according to:

$$r \ge \frac{\lceil \log_{(1-n)^2} p \rceil}{d},$$

where n=f/T and p is the desired percent of the time a failure will be detected. Thus, using the example above for Equation 2, the minimum rate required would be 46 packets per second, which is slightly higher than the half of the result calculated for connections above.

According to embodiments, once the adjusted rates are determined for the categories of traffic or categories are updated, testing system 210 may then re-transmit the adjusted rates/categories to VM 125. The configurable traffic generator 230 may then update the rate at which it sends packets to test connections for each category of traffic and continues to send test packets after weighting a random interval of time. It should be noted that the testing process described may be repeated until a threshold confidence is met for each category of traffic.

Figure 3:
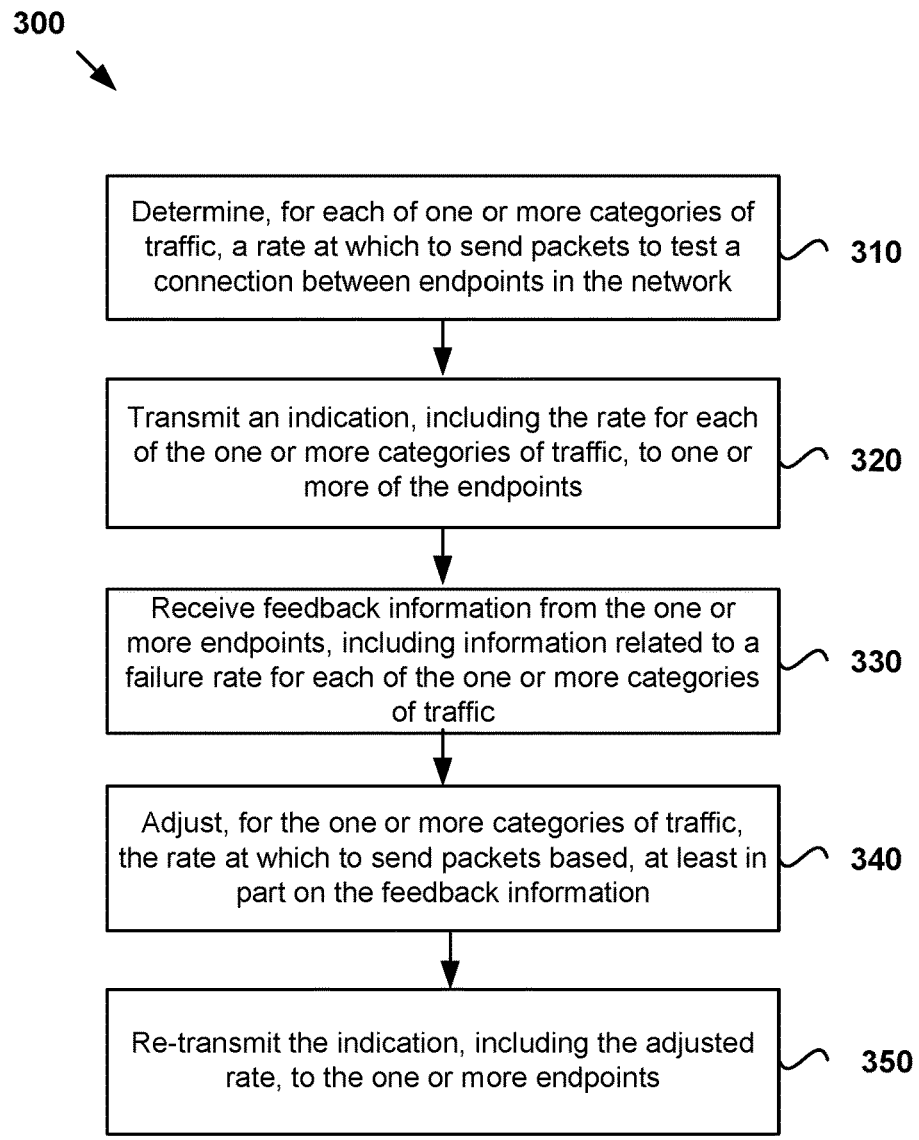
FIG. 3 illustrates example operations for testing a logical network comprising a plurality of endpoints.

FIG. 3 illustrates example operations 300 for testing a software defined network comprising a plurality of endpoints. Operations 300 may be performed, for example, by a network controller in a logical network.

At 310, the network controller determines, for each of one or more categories of traffic, a rate at which to send packets to test a connection between endpoints in the logical network.

At 320, the network controller transmits an indication, including the rate for each of the one or more categories of traffic, to one or more of the endpoints. As noted, transmitting the indication may include storing the indication in a key-value store, which may be accessed by one or more endpoints in the network.

At 330, the network controller receives feedback information from the one or more endpoints, including information related to a failure rate for each of the one or more categories of traffic.

At 340, the network controller adjusts, for the one or more categories of traffic, the rate at which to send packets based, at least in part on the feedback information.

At 350, the network controller re-transmits the indication, including the adjusted rate, to the one or more endpoints.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for testing a logical network comprising a plurality of endpoints, the method comprising:
   determining, for each of one or more categories of traffic, a rate at which to send packets to test a connection between endpoints in the logical network;
   transmitting an indication, including the rate for each of the one or more categories of traffic, to one or more of the endpoints;
   receiving feedback information from the one or more endpoints, including information related to a failure rate for each of the one or more categories of traffic;
   adjusting, for the one or more categories of traffic, the rate at which to send packets based at least in part on the feedback information, wherein adjusting comprises adjusting a rate for a first category of traffic based on a failure rate for the first category of traffic as compared to failure rates for each of the one or more categories of traffic; and
   re-transmitting the indication, including the adjusted rate, to the one or more endpoints.

2. The method of claim 1, wherein the adjusted rate for the first category of traffic is determined according to:

$$\text{rate}_{category} = \text{rate}_{total} \times \frac{\text{error}_{category}}{\text{error}_{total}} = \frac{R\sqrt{p_c(1-p_c)}}{\sum_{x \in [1,n]} \sqrt{p_x(1-p_x)}},$$

where $\text{rate}_{category}$ is the adjusted rate for the first category of traffic, R is the total rate of sending packets across all of the one or more categories of traffic, $p_c$ is the success rate for the first category of traffic, and $p_{1 \ldots n}$ is the success rate for each of the one or more categories of traffic.

3. The method of claim 1, wherein packets sent to test the connection between endpoints are sent in a first namespace, and wherein the indication and the feedback information are communicated in a second namespace that is different than the first namespace.

4. The method of claim 1, further comprising adjusting the one or more categories of traffic based on the feedback information.

5. The method of claim 1, wherein the one or more categories of traffic include at least one of Transmission Control Protocol (TCP) traffic, User Datagram Protocol (UDP) traffic, Internet Control Message Protocol (ICMP) traffic, traffic traversing only switches or only routers, or traffic that is designed to test a set of connections within defined firewall rules.

6. The method of claim 1, wherein transmitting the indication comprises storing the indication in a database.

7. The method of claim 1, further comprising determining a minimum rate at which to send packets for categories of traffic observed as always-succeeding or always-failing.

8. The method of claim 7, wherein the minimum rate is determined according to:

$$r \geq \frac{\lceil \log_{1-e} p \rceil}{d},$$

where d is the period over which endpoints are to send traffic at the minimum rate r, e is the percent of connections between endpoints to detect an outage on during p percent of the time.

9. The method of claim 1, wherein receiving feedback information comprises accessing the feedback information in a database.

10. A computer system, wherein system software for the computer system is programmed to execute a method for testing a logical network comprising a plurality of endpoints, the method comprising:
    determining, for each of one or more categories of traffic, a rate at which to send packets to test a connection between endpoints in the logical network;
    transmitting an indication, including the rate for each of the one or more categories of traffic, to one or more of the endpoints;
    receiving feedback information from the one or more endpoints, including information related to a failure rate for each of the one or more categories of traffic;
    adjusting, for the one or more categories of traffic, the rate at which to send packets based at least in part on the feedback information, wherein adjusting comprises adjusting a rate for a first category of traffic based on a failure rate for the first category of traffic as compared to failure rates for each of the one or more categories of traffic; and
    re-transmitting the indication, including the adjusted rate, to the one or more endpoints.

11. The computer system of claim 10, wherein the adjusted rate for the first category of traffic is determined according to:

$$\text{rate}_{category} = \text{rate}_{total} \times \frac{\text{error}_{category}}{\text{error}_{total}} = \frac{R\sqrt{p_c(1-p_c)}}{\sum_{x \in [1,n]} \sqrt{p_x(1-p_x)}},$$

where $\text{rate}_{category}$ is the adjusted rate for the first category of traffic, R is the total rate of sending packets across all of the one or more categories of traffic, $p_c$ is the success rate for the first category of traffic, and $p_{1 \ldots n}$ is the success rate for each of the one or more categories of traffic.

12. The computer system of claim 10, wherein packets sent to test the connection between endpoints are sent in a first namespace, and wherein the indication and the feedback information are communicated in a second namespace that is different than the first namespace.

13. The computer system of claim 10, wherein the method further comprises adjusting the one or more categories of traffic based on the feedback information.

14. The computer system of claim 10, wherein the one or more categories of traffic include at least one of Transmission Control Protocol (TCP) traffic, User Datagram Protocol (UDP) traffic, Internet Control Message Protocol (ICMP)

traffic, traffic traversing only switches or only routers, or traffic that is designed to test a set of connections within defined firewall rules.

15. The computer system of claim 10, wherein transmitting the indication comprises storing the indication in a database.

16. The computer system of claim 10, wherein the method further comprises determining a minimum rate at which to send packets for categories of traffic observed as always-succeeding or always-failing.

17. The computer system of claim 16, wherein the minimum rate is determined according to:

$$r \geq \frac{\lceil \log_{1-e} p \rceil}{d},$$

where d is the period over which endpoints are to send traffic at the minimum rate r, e is the percent of connections between endpoints to detect an outage on during p percent of the time.

18. The computer system of claim 10, wherein receiving feedback information comprises accessing the feedback information in a database.

19. A computer system for testing a logical network comprising a plurality of endpoints, comprising:

means for determining, for each of one or more categories of traffic, a rate at which to send packets to test a connection between endpoints in the network;

means for transmitting an indication, including the rate for each of the one or more categories of traffic, to one or more of the endpoints;

means for receiving feedback information from the one or more endpoints, including information related to a failure rate for each of the one or more categories of traffic, means for adjusting, for the one or more categories of traffic, the rate at which to send packets based at least in part on the feedback information, wherein means for adjusting comprises means for adjusting a rate for a first category of traffic based on a failure rate for the first category of traffic as compared to failure rates for each of the one or more categories of traffic; and means for re-transmitting the indication, including the adjusted rate, to the one or more endpoints.

* * * * *